United States Patent Office 3,767,803
Patented Oct. 23, 1973

3,767,803
STABLE AQUEOUS PYRITINOL SOLUTIONS
Eberhard Nürnberg, Darmstadt, Germany, assignor to Merck Patent Gesellschaft mit beschränkter Haftung, Darmstadt, Germany
No Drawing. Filed Sept. 24, 1971, Ser. No. 183,641
Claims priority, application Germany, Sept. 26, 1970, P 20 47 486.6
Int. Cl. A61k 27/00
U.S. Cl. 424—263
8 Claims

ABSTRACT OF THE DISCLOSURE

Aqueous solutions of bis[3-hydroxy-4-hydroxymethyl-2-methyl-pyridyl-(5)-methyl]-disulfide (pyritinol) are stabilized by a mixture of (a) a physiologically acceptable acid of 1–6 carbon atoms and (b) vitamin $B_1$, vitamin $B_6$, diethanolamine, 1-benzyl-3-ethyl-6,7-dimethoxyisoquinoline, nicotinic acid amide or other physiologically acceptable base.

BACKGROUND OF THE INVENTION

This invention relates to the stabilization of aqueous solutions of pyritinol.

Pyritinol (bis[3 - hydroxy-4-hydroxymethyl-2-methyl-pyridyl-(5)-methyl]-disulfide) is utilized, in the form of the salts thereof, e.g., the dihydrochloride monohydrate (pyrithioxin) or the sulfate, not only orally but also parenterally in the form of an aqueous solution. The parenteral dosage is normally about 150–200 mg. Prior to the infusion, the pyritinol solution is diluted with a suitable infusion fluid, e.g., physiological NaCl solution or dextrose solution, to a volume of at least 20 ml., preferably 250–500 ml.

Although the salts of pyritinol are water-soluble, stable aqueous solutions thereof are not readily prepared. Such solutions, e.g., filled into ampoules, exhibit clearly perceptible clouding after a storage period of about 4–6 weeks. Upon longer storage, crystalline deposits occurred to an increasing extent. Such preparations can no longer be employed for the intended purpose as a parenteral administration. They are particularly unsuitable for intravenous injections or infusions. Therefore, in order to administer pyritinol parenterally, it has heretofore been necessary to prepare pyritinol commercially in lyophilized form in sealed dry ampoules, from which the aqueous injection solution is prepared shortly prior to the use thereof. Pyritinol in this form has several disadvantages compared to an ampoule containing a sterile aqueous solution. The dry form is more difficult to manufacture and more cumbersome to use.

It is therefore an object of this invention to provide novel stable aqueous pyritinol solutions suitable for parenteral administration. Other objects will be apparent to those skilled in the art to which this invention pertains.

SUMMARY OF THE INVENTION

The aqueous pyritinol solutions of this invention contain a stabilizing amount of at least one physiologically acceptable organic acids of 1–6 carbon atoms and one or more physiologically acceptable bases. In a preferred aspect, this invention relates to sealed ampoules containing therein a stabilized pyritinol solution of this invention.

In its process aspect this invention relates to a process for the stabilization of an aqueous pyritinol injection solution, wherein there are added thereto about 0.1–25%, preferably 3–20%, of one or more physiologically acceptable organic acids of 1–6 carbon atoms, and about 0.1–25%, preferably 0.2–3%, of one or more physiologically acceptable bases, preferably one or more of vitamin $B_1$, vitamin $B_6$, diethanolamine and 1-benzyl-3-ethyl-6,7-dimethoxyisoquinoline, preferably in the form of a physiologically acceptable acid addition salt thereof, and nicotinic acid amide, and thereafter, optionally, adding thereto a strong base, e.g., sodium or potassium hydroxide, to adjust to the desired pH, and/or one or more preservatives.

DETAILED DISCUSSION

The percentages indicated for the ingredients of the aqueous pyritinol solution of this invention are given on the basis of the solution weight.

The organic acids employed in this invention are physiologically acceptable acids containing 1–6 carbon atoms.

Examples of suitable organic acids are, e.g., one or more of a monocarboxylic acid, e.g., formic acid or other alkanic acid, a dicarboxylic acid, e.g., malonic acid, adipic acid or other alkanedioic acid, an hydroxy acid, e.g., lactic acid, tartaric acid, citric acid or other oxyalkanoic acid, an enolic acid, e.g., ascorbic acid. Other fatty acids, such as acetic acid, are likewise operable, but are not preferred because of their odor. Especially preferred are formic acid, malonic acid, adipic acid, lactic acid, tartaric acid, citric acid, glutamic acid, ascorbic aid and mixtures thereof. The aids are employed at a concentration of about 0.1 to 25%, preferably 3–20%.

Although any physiological amine can be employed, especially suitable are those containing a pyridine or pyrimidine ring, or diethanolamine. Heterocyclic amines having physiological activity, e.g., one or more of vitamin $B_1$, vitamin $B_6$, 1-benzyl-3-ethyl-6,7-dimethoxyisoquinoline, preferably in the form of a physiologically acceptable acid addition salt thereof, and nicotinic acid amide are particularly well suited. Vitamin $B_6$-hydrochloride (pyridoxolium chloride), optionally together with diethanolamine, is especially preferred. The bases are employed at a concentration of about 0.1 to 25%, preferably 0.2 to 3%.

The pyritinol solutions of this invention have a pH of between 2.1 and 3.0. To obtain the desired final pH, optionally a strong base can be added to the solution, e.g., sodium or potassium hydroxide.

In addition to the above-named specific compounds, also suitable are the functional derivatives thereof, e.g., the acyl derivatives of vitamin $B_1$, pyridoxal, pyridoxamine. These substances are preferably added in the form of a physiologically acceptable acid addition salt thereof, preferably a hydrochloride, e.g., thiaminium dichloride, pyridoxolium chloride and eupaverin hydrochloride. One or several of these bases or their salts can be employed in the solutions of this invention.

Because the acids and amines often exist as a salt in solution, the type and amount of acids and amino compound is selected so that any salt which is formed is soluble and does not crystallize out of solution.

The solutions of this invention can contain one or more conventional preservatives. Typical preservatives are benzyl alcohol, methyl p-hydroxybenzoate, isopropyl p-hydroxy-benzoate and sorbic acid. The amount of such preservatives employed is not critical and they are used at conventional concentrations, e.g., about 0.1–1%.

The pyritinol can be present in the novel solutions of this invention over a wide range of concentration, e.g., between about 2% and 10%, calculated on the solution weight. In addition to the preferred dihydrochloride monohydrate (pyrithioxin), other physiologically acceptable salts of pyritinol can also be employed in the solutions of this invention, e.g., an acid addition salt of any physiological acceptable acid, including salts of mineral acids, e.g., the hydrobromide, sulfate, nitrate, phosphates, salts of organic carboxylic and sulfonic acids, e.g., citrate, methanesulfonate, ethanesulfonate and p-toluenesulfonate.

The preferred stabilized aqueous pyritinol solutions of this invention consist essentially of (a) about 2 to 10% of pyritinol or a physiologically acceptable salt thereof; (b) about 0.1 to 25%, preferably 3-20%, of a physiologically acceptable organic acid of 1 to 6 carbon atoms; (c) about 0.1-25%, preferably 0.2-3%, of a physiologically acceptable base; and, optionally, (d) about 0.1-1% of a preservative.

According to this invention, an injectable pyritinol solution can be produced from the above-described components in a variety of ways. A particularly suitable method is described hereinafter.

Pyritinol solutions prepared in accordance with this invention show no sediment or precipitate, even after a storage period of several years.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE A

Employing the amounts of one of the formulation examples hereinafter, pyritinol in the form of its dihydrochloride monohydrate is dissolved in the cold in about half of the desired final volume of cold water. Thereafter, the selected organic acid is added, followed by an amino compound, preferably as a concentrated aqueous solution. If necessary, the desired final pH is obtained by the addition of a strong base. Water is then added to approximately 95% of the final volume. The preservative is added and the final volume is obtained by adding additional water. When using a p-hydroxybenzoic acid ester as a preservative, it is suitably first dissolved with heating in a small amount of water and the thus-obtained aqueous solution then added to the mixture. The finished injectable solution is thereafter subjected to an electrometric pH control, passed under aseptic conditions through a sterilizing filter layer, filtered free of any sediment and mechanically filled aseptically into ampoules with the prior and subsequent use of an inert gas atmosphere, e.g., nitrogen or argon.

The following formulation examples relate to the preparation of the 2 ml. and 5 ml. formulations for sealing in a sterile form in ampoules, following the procedure of Example A.

EXAMPLES FOR AMPOULES OF 2 ML.

Example 1

| | Mg. |
|---|---|
| Pyrithioxin (pyritinol dihydrochloride monohydrate) | 200 |
| Tartaric acid | 160 |
| Vitamin $B_1$-hydrochloride | 10 |
| Vitamin $B_6$-hydrochloride | 10 |
| 27% sodium hydroxide solution | 97.4 |
| Benzyl alcohol | 20 |

Example 2

| | Mg. |
|---|---|
| Pyrithioxin | 150 |
| Formic acid (98-100%) | 140 |
| Vitamin $B_1$-hydrochloride | 16 |
| 32% sodium hydroxide solution | 82.5 |
| Benzyl alcohol | 20 |

Example 3

| | Mg. |
|---|---|
| Pyrithioxin | 200 |
| Lactic acid, 90% | 100 |
| Vitamin $B_6$-hydrochloride | 50 |
| Diethanolamine | 8.5 |
| Benzyl alcohol | 20 |

Example 4

| | Mg. |
|---|---|
| Pyrithioxin | 150 |
| 1-benzyl-3-ethyl-6,7dimethoxyisoquinoline hydrochloride | 60 |
| Citric acid | 140 |
| 32% sodium hydroxide solution | 82.5 |
| Benzyl alcohol | 20 |

EXAMPLES FOR AMPOULES OF 5 ML.

Example 5

| | Mg. |
|---|---|
| Pyrithioxin | 200 |
| Tartaric acid | 400 |
| Vitamin $B_1$-hydrochloride | 10 |
| Vitamin $B_6$-hydrochloride | 10 |
| 32% sodium hydroxide solution | 253.5 |
| Benzyl alcohol | 50 |

Example 6

| | Mg. |
|---|---|
| Pyrithioxin | 150 |
| Formic acid (98-100%) | 350 |
| Vitamin $B_1$-hydrochloride | 40 |
| 32% sodium hydroxide solution | 230 |
| Benzyl alcohol | 50 |

Example 7

| | Mg. |
|---|---|
| Pyrithioxin | 150 |
| Tartaric acid | 400 |
| Vitamin $B_6$-hydrochloride | 40 |
| Nicotinic acid amide | 20 |
| Diethanolamine | 93 |
| Benzyl alcohol | 50 |

Example 8

| | Mg. |
|---|---|
| Pyrithioxin | 150 |
| 1-benzyl-3-ethyl-6,7-dimethoxyisoquinoline hydrochloride | 150 |
| 32% sodium hydroxide solution | 136.25 |
| Methyl p-hydroxybenzoate | 5 |
| Citric acid | 350 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An aqueous pyritinol solution of pH 2.1 to 3 comprising about 2-10% pyritinol stabilized with a mixture of (a) about 3-20% of at least one physiologically acceptable organic acid selected from the group consisting of formic acid, malonic acid, adipic acid, lactic acid, tartaric acid, citric acid, glutamic acid and ascorbic acid; and (b) about 0.2-3% of at least one physiologically acceptable base selected from the group consisting of vitamin $B_1$, vitamin $B_6$, diethanolamine, 1-benzyl-3-ethyl-6,7-dimethoxyisoquinoline, a physiologically acceptable acid addition salt of one of the above and nicotinic acid amide in stabilizing effective amounts.

2. A pyritinol solution according to claim 1 wherein the base is vitamin $B_6$-hydrochloride.

3. A pyritinol solution according to claim 1 wherein the base is a mixture of vitamin $B_6$-hydrochloride and diethanolamine.

4. A sterile physiologically acceptable pyritinol solution according to claim 1.

5. A sealed glass ampoule containing a pyritinol solution according to claim 4.

6. A solution according to claim 4 containing, per 2 ml. of solution, 200 mg. pyrithioxin; 100 mg. lactic acid, 90%; 50 mg. vitamin $B_6$-hydrochloride; 8.5 mg. diethanolamine; and 20 mg. benzyl alcohol.

7. A solution according to claim 1 wherein the acid is formic acid, lactic acid, tartaric acid or citric acid.

8. A solution according to claim 1 further including 0.1–1%, based on the solution weight, of a preservative selected from the group consisting of benzyl alcohol, methyl-p-hydroxybenzoate, isopropyl p-hydroxybenzoate and sorbic acid.

References Cited

UNITED STATES PATENTS 3,010,966  11/1961  Zima et al. _____ 260—297.5

FOREIGN PATENTS 948M  11/1961  France _____ 424—263
1,030,400  5/1966  Great Britain _____ 424—263

OTHER REFERENCES

Merck Index, 5th ed., p. 593.

ALBERT T. MEYERS, Primary Examiner

N. A. DREZIN, Assistant Examiner

U.S. Cl. X.R.

424—255, 258, 266, 317, 325